United States Patent
Sepe, Jr.

(10) Patent No.: US 7,589,482 B2
(45) Date of Patent: Sep. 15, 2009

(54) HOT SPOT SENSORING CONTROL OF LINEAR MOTORS

(76) Inventor: Raymond B. Sepe, Jr., 29 Pederzini Dr., Medfield, MA (US) 02052

( * ) Notice: Subject to any disclaimer, the term of this patent is extended or adjusted under 35 U.S.C. 154(b) by 275 days.

(21) Appl. No.: 11/757,776

(22) Filed: Jun. 4, 2007

(65) Prior Publication Data
US 2007/0290637 A1  Dec. 20, 2007

Related U.S. Application Data

(60) Provisional application No. 60/803,795, filed on Jun. 2, 2006.

(51) Int. Cl.
*H02P 7/00* (2006.01)
(52) U.S. Cl. .................. 318/135; 318/560; 318/671; 318/687
(58) Field of Classification Search .............. 318/135, 318/560, 671, 687
See application file for complete search history.

(56) References Cited

U.S. PATENT DOCUMENTS

| | | | | |
|---|---|---|---|---|
| 4,312,033 A | * | 1/1982 | Sweeney et al. | 700/56 |
| 4,595,870 A | * | 6/1986 | Chitayat | 318/687 |
| 5,116,002 A | * | 5/1992 | Veraart | 246/187 R |
| 6,400,046 B1 | * | 6/2002 | Hwang et al. | 310/12 |
| 6,989,641 B2 | | 1/2006 | Schulz et al. | |
| 7,385,363 B2 | * | 6/2008 | Schemm | 318/135 |

OTHER PUBLICATIONS

Sepe, R.B., Jr. et al., "Fault Tolerant Operation of Induction Motor Drives with Automatic Controller Reconfiguration", Electronic Machines & Drives Conference, 2001, pp. 156-162.

* cited by examiner

*Primary Examiner*—Bentsu Ro
*Assistant Examiner*—David S Luo
(74) *Attorney, Agent, or Firm*—IP Authority, LLC; Ramraj Soundararajan; William McBeth (57) ABSTRACT

A system implementing a controller for linear motors is disclosed having a plurality of switches, a reorganization switch control detecting available hot spot sensors, encoder failures, and current sensor failures, and a storage storing a decision matrix having controller reorganization conditions. Upon detecting available hot spot sensors, encoder failures and recoveries, and current sensor failures and recoveries, the reorganization switch control reorganizes itself via configuring at least one of the switches based on information in said decision matrix to operate without available sensors and using available sensors.

45 Claims, 9 Drawing Sheets

Figure 1. Linear motor system.

Figure 4. Typical launch profile with locations of hot spot sensors shown along profile.

HOT SPOT SENSING CONTROL OF LINEAR MOTORS

BACKGROUND OF THE INVENTION

1. Field of Invention

The present invention relates generally to the field of regulating linear motors. More specifically, the present invention is related to hot spot sensing control of linear motors.

2. Discussion of Prior Art

Vector control techniques used to regulate the motion of linear motor shuttles for high performance applications utilize position sensors so that the location of the moving shuttle is known and current sensors in order to regulate the currents of the motor. However, as in the case of rotary motor systems, the position sensors are a more fragile part of the system and their failure can render the controller useless. For long linear motors, linear position sensors need to extend along the entire length of the track, making them even more problematic. They are subject to environmental stresses and failures, as well as greatly increasing the cost and complexity of the control system. Because of their relatively large air gap and because of end effects, extension of mechanically sensorless control techniques used on rotary motors to the linear motor has been met with only limited success.

There are many types of linear motor systems including synchronous linear motors, switched reluctance linear motors, permanent magnet linear motors, and linear induction motors. The Hot Spot Sensing Controller is applicable to all of these but the discussion here will focus on the linear induction motor (LIM).

Figure 1:
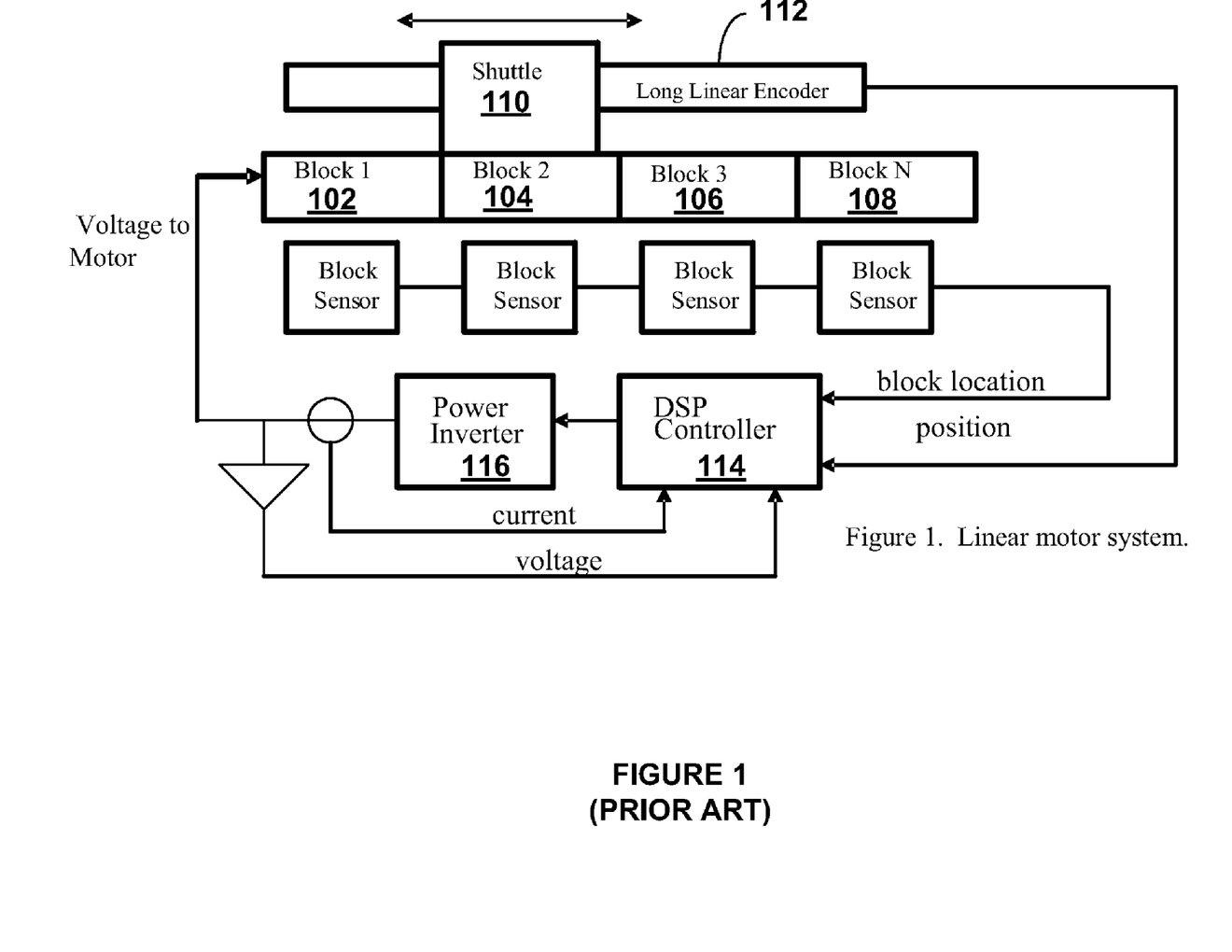
FIG. 1 illustrates a block diagram of a prior art linear motor system.

FIG. 1 shows a block diagram of a typical linear induction motor system with a series of stationary stator coils 102, 104, 106, 108 called motor blocks and a moving shuttle 110 which is analogous to the rotor of a rotary induction motor. Shuttle 110 is often composed of a layer of aluminum and a layer of steel or embedded conductive bars in a steel back plate. The voltages are applied to the stator coils 102, 104, 106, 108 which generate currents in the conductors and ultimately generate electromagnetic force that propels shuttle 110 along the track. Force is generated on shuttle 110 only by stator blocks 102, 104, 106, 108 that are energized below shuttle 110. Stator blocks 102, 104, 106, 108 are, therefore, energized directly beneath shuttle 110 and one block ahead of shuttle 110 so that the force is relatively constant as shuttle 110 traverses the track. The switching of applied voltage along sequential motor blocks is termed block switching. Some linear motor systems use a set of discrete sensors such as optical or hall effect sensors in order to determine the position of the shuttle relative to the motor blocks so that the proper motor blocks can be energized. Typically, there would be one or two of these sensors per motor block since only a crude measurement is required. For vector current control and for precise motion control, a finer measure of position is generated from a device such a linear encoder 112 (or equivalent). These might typically sense position down to a fraction of an electrical cycle. Encoder position feedback, stator current feedback, voltage feedback, and in some cases coarse block sensor feedback are available to the control system. A typical control system consists of a processing element such a computer or digital signal processor engine 114 in combination with sensor conditioning and power electronics inverter 116 that provide voltages and currents suitable to operate the linear motor.

The paper titled "Fault Tolerant Operation of Induction Motor Drives with Automatic Controller Reconfiguration", IEMDC 2001, discloses a reorganizing control strategy of a fault tolerant controller for rotary induction motors. In that system, an encoder failure would be detected and after a force transient due to detection latency, a sensorless controller would be engaged. It was not known when, or if, an encoder failure might occur. That work was targeted to applications where rotary speed would vary slowly so that a sensorless controller could readily be initialized and operated with minimal error. The solution provided a "limp back" capability in which a faulted system could still operate.

Figure 2:
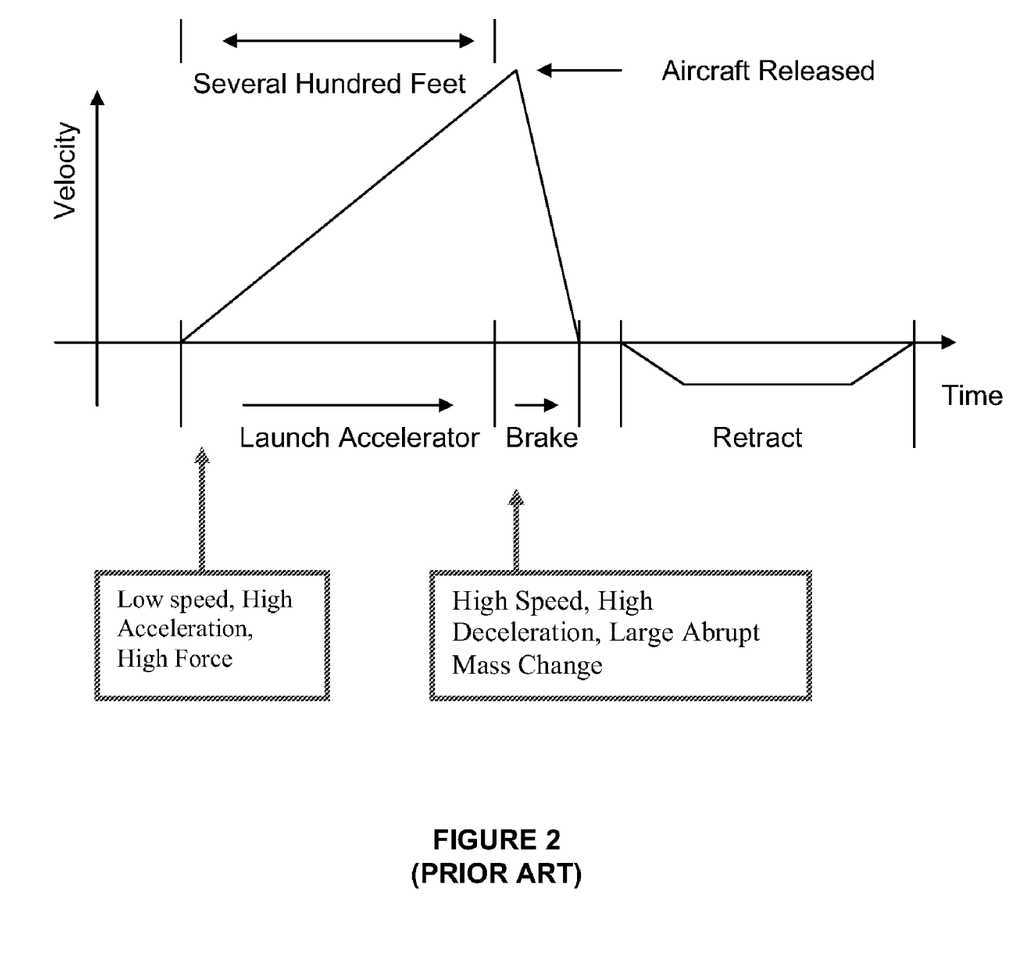
FIG. 2 illustrates a typical launch profile.

One application for a long linear motor is to accelerate an aircraft over a several hundred feet track and then to stop almost immediately after the aircraft has been launched. FIG. 2 shows a typical launch profile and identifies particularly difficult operating conditions at the start and end of the launch. At the start of the launch at near zero speed and high force, there is insufficient information in the sensed voltages and currents for a measurement based sensorless controller and in fact, recent studies have found the motor to be unobservable at this point. If the motor is started without feedback control so that a sensorless controller could be engaged at a higher speed, there would be a period of time required for the sensorless controller to properly lock onto the motor profile. This would create force transients and speed variations that would jeopardize the ability of the system to properly attain the required end speed and keep jerk within acceptable limits in order to launch the aircraft. At the point that the aircraft is released, there is a very large mass change as the plane is disengaged from the motor shuttle and there is a requirement for sudden braking in order to stop the shuttle itself from traveling beyond the track. This region of operation is also not amenable to standard sensorless control techniques. Neither of these conditions is addressed in the previous work.

Whatever the precise merits, features, and advantages of such prior art linear motor systems, none of them achieves or fulfills the purposes of the present invention.

SUMMARY OF THE INVENTION

The present invention provides for a method implemented in a controller for a linear motor comprising: detecting position sensors distributed along stroke; and when properly functioning, the self-reorganizing controller uses said detected position sensors for control, and when said position sensors are not present, or when said position sensors are present but malfunction, or when said position sensors are present but of limited length, reorganizing said controller to operate without them so that they are no longer in proximity to the moving secondary.

The present invention provides for a system implementing a controller for linear motors comprising: a plurality of switches; a reorganization switch control detecting available hot spot sensors, encoder failures, and current sensor failures; a storage storing a decision matrix having controller reorganization conditions; and upon detecting available hot spot sensors, encoder failures, and current sensor failures, said reorganization switch control reorganizing itself via configuring at least one switch in said plurality of switches based on information in said decision matrix to operate without available sensors and using available sensors.

The present invention provides for a controller for linear motors comprising: a plurality of switches; a reorganization switch control detecting available hot spot sensors, encoder failures, and current sensor failures; a decision matrix mechanism having controller reorganization conditions, said decision matrix mechanism receiving sensor inputs and detecting presence and operational status of said received sensor inputs, said decision matrix mechanism inputs motor operating conditions and generates virtual switching signals to reconfigure a motor controller to eliminate or recover use of one or more sensors or operating modes.

In one embodiment, operating without the sensors includes any of the following: observers based on electrical measurements, adaptive or self correcting observers based on mathematical models with a correction from any operating sensors, and feedforward profiles.

In an extended embodiment, the observers are based on any of the following: signal measurements such as voltages/currents, mathematical models of mechanical/electrical dynamics of a system associated with said controller of said linear motor. The mathematical model of the mechanical dynamics further comprises a correction mechanism based on feedback from at least one coarse position sensor such as block switch sensors, wherein said observer utilizes said feedback information to update and resynchronize its outputs and states.

In one embodiment, the observer based on mathematical model of the mechanical/electrical dynamics includes a correction mechanism based on feedback from coarse position sensors such as block switch sensors and adapts itself to include a correction based on an estimate of any load or force disturbances, either in real-time and/or from apriori knowledge.

In another embodiment, the present invention further comprises a disturbance force estimator for linear motors uses a difference between outputs of said mathematical model of the system dynamics with a measurement of motor position or speed. The measurements can be derived from at least one coarse sensor such as block sensors or a position encoder. In one embodiment, the disturbance force estimator records, maps, or monitors disturbances for any of the following: early warning of failures, mechanical wear, preventive maintenance, and fault diagnostics and servicing.

In one embodiment, the controller is used in an electromagnetic aircraft launch system. In this embodiment, a short strip of position encoder is placed in critical locations such as start of launch and in the aircraft release and braking regions.

In another embodiment, the controller is used in a maglev system.

In yet another embodiment, the controller is used in a material handling application.

In one embodiment, a sensitivity factor is used to determine whether position sensorless control based on measurement of motor currents performs effectively, wherein the sensitivity factor is given by $$CS = \frac{\partial I_s}{\partial \omega_r}\bigg|_{\substack{v_s=const.\\ \omega_s=const.}}$$

in which $I_s$, $\omega_r$, $\omega_s$, and $V_s$ stand for phase current, motor speed, synchronous speed and phase voltage.

In another embodiment, a percentage of current sensitivity to speed variation is calculated as following:

$$CS(\%) = 100 * \frac{(\partial I_s/I_s)}{\partial \omega_r}\bigg|_{\substack{v_s=const.\\ \omega_s=const.}},$$

said percentage of current sensitivity to speed variation is used to determine whether position sensorless control based on measurement of motor currents performs effectively.

In one embodiment, a sensitivity factor is used to determine whether position sensorless control based on measurement of motor currents performs effectively, wherein the sensitivity factor expressed in terms of equivalent circuit parameters on a standard equivalent "T" circuit model of the motor is given by $$\frac{X_m}{R_2} \gg 1 \text{ and} \frac{X_m}{X_1} \gg 1,$$

where $X_m$ is the magnetizing reactance, $R_2$ is a secondary resistance or rotor resistance in case of a rotary motor, and $X_1$ is a primary leakage reactance or stator leakage reactance in the case of a rotary motor.

In one embodiment, the linear motor's geometry and materials are picked based on a sensitivity factor such that a given motor will be effective with measurement based sensorless control methods, said sensitivity factor given by $$CS = \frac{\partial I_s}{\partial \omega_r}\bigg|_{\substack{v_s=const.\\ \omega_s=const.}}$$

in which $I_s$, $\omega_r$, $\omega_s$, and $V_s$ stand for phase current, motor speed, synchronous speed and phase voltage.

In another embodiment, the linear motor's geometry and materials are picked based on a percentage of current sensitivity to speed variation, said percentage of current sensitivity to speed variation is calculated as following:

$$CS(\%) = 100 * \frac{(\partial I_s/I_s)}{\partial \omega_r}\bigg|_{\substack{v_s=const.\\ \omega_s=const.}}.$$

In one embodiment, a linear motor's geometry and materials are picked based on a sensitivity factor such that a given motor will be effective with measurement based sensorless control methods, said sensitivity factor expressed in terms of equivalent circuit parameters $$\frac{X_m}{R_2} \gg 1 \text{ and } \frac{X_m}{X_l} \gg 1$$

where $X_m$ is the magnetizing reactance, $R_2$ is a secondary resistance or rotor resistance in case of a rotary motor, and $X_1$ is a primary leakage reactance or stator leakage reactance in the case of a rotary motor.

The present invention's Hot Spot Sensing Controller eliminates the need for the long linear encoder along the length of the track and to add fault resilience to the system by allowing it to continue to operate, albeit at a reduced performance level, in the event that a position sensor fails (in a system that uses a position sensor) or a current sensor fails. The Hot Spot Sensing Controller is the same for single sided and dual sided LIMs.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention provides for a hot spot sensing controller for a linear motor that uses reorganization techniques as part of its standard operation. It is effective in more demanding linear motor applications with relatively long stroke length and a quickly changing speed. In one embodiment, a particular focus is on the Navy's Electro Magnetic Aircraft Launch System (EMALS) in which a linear motor will be used to accelerate an aircraft over several hundred feet and then stop almost immediately after the aircraft is launched. This is particularly challenging for several reasons: the relatively large air gap and high leakage of linear motors reduces the effectiveness of industry standard sensorless control approaches, the entire operation is transient in nature with large changes in mass and speed in a short period of time, and force transients need to be minimized to avoid excessive mechanical wear and electrical stresses.

Existing high performance linear motor controllers use position sensing along the entire length of the several hundred foot track in order to control the motor. However, the present invention's Hot Spot Sensing Controller places a short encoder segment at the start and the end regions of the track in order to gain the benefits of encoder based feedback control in these critical or "Hot Spots", but no longer requires hundreds of feet of encoder, thereby minimizing the use of position feedback. The controller reorganizes automatically to optimally use position sensors as they are encountered. Because the encoder segments are placed at known locations, this apriori knowledge is also incorporated into the Hot Spot Sensing Controller so that the transition between control reorganization is no longer based solely on encoder failure. This allows the nominal operation of the Hot Spot Sensing Controller to eliminate the force transient that results from the detection latency of an encoder failure (as in Applicants' paper described above), and now provides completely seamless operation. It should be noted that the ability to detect encoder failure and to reorganize is retained in the event that there is a failure in the encoder segments. It should also be noted that this system can also be used with a full length encoder to improve reliability in the event of an encoder failure. It can also be use with encoder segments placed without the prior knowledge of the controller but there will then be a force transient due to detection latencies.

Figure 3:
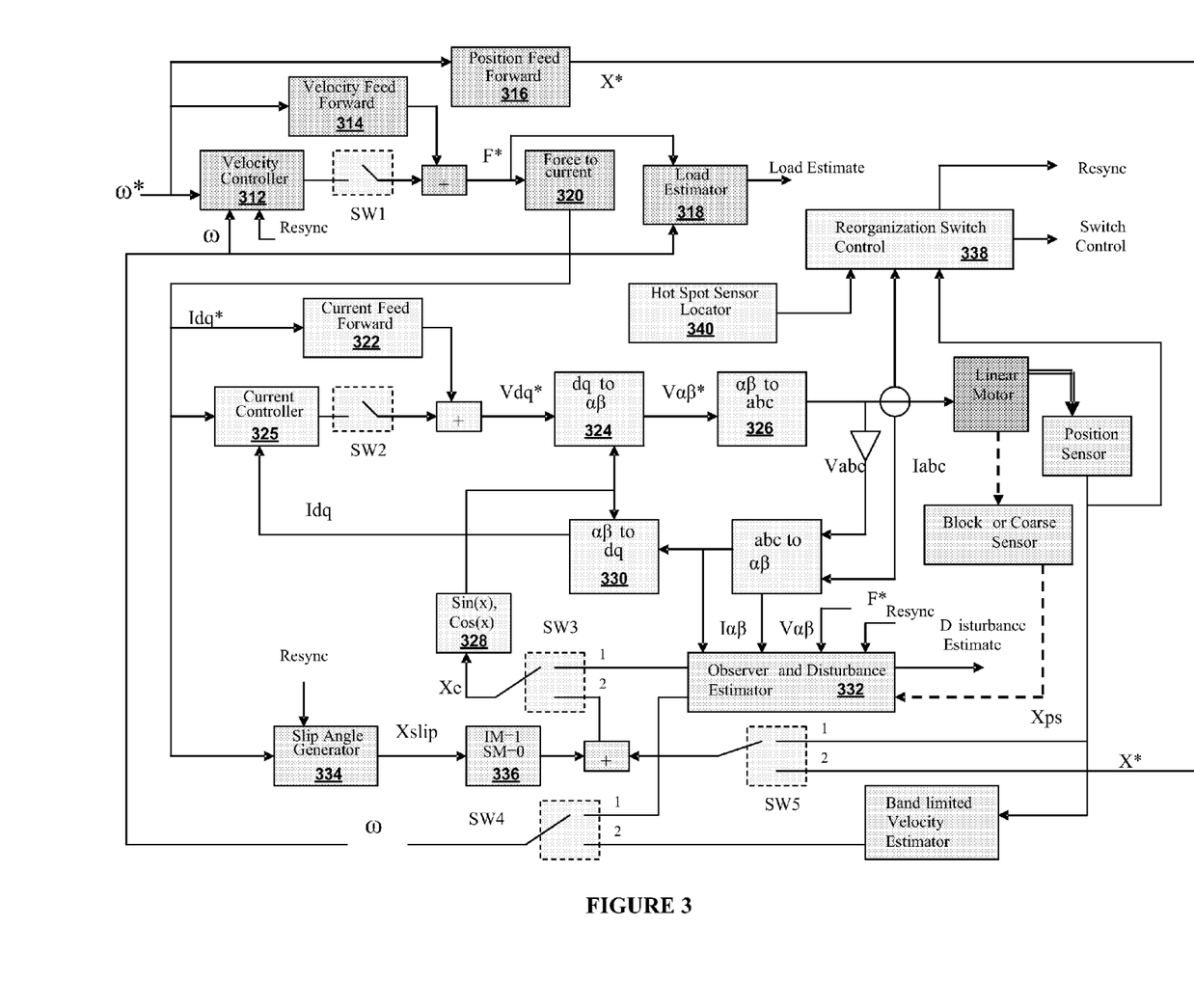
FIG. 3 illustrates a block diagram illustrating the functionality of the present invention's hot spot sensing controller.

The Hot Spot Sensing Controller architecture is shown in FIG. 3. The structure consists of a cascaded velocity controller in series with a vector current controller. If applicable, it is also common practice to include a position loop. This system differs significantly in that there are additional switching components, reorganization switch controls, and resynchronization that are used to automatically detect hot spot position sensors and sensor failures and to automatically reorganize the controller.

A velocity command $\omega^*$ that varies with time is input to the system. This velocity profile is the desired speed trajectory for the linear motor. Velocity controller 312 accepts the velocity command and velocity feedback $\omega$ and generates a desired force output that is based on the velocity error between the commanded and the feedback velocity. The type of velocity controller equations depend upon the application and can be any found in the present state of the art. Without loss of generality, a velocity controller can be an integral-proportional (IP) controller such as $$z(k+1)=z(k)+\delta(\omega^*-\omega)$$

$$y(k)=G_{wi}z(k)-G_{wp}\omega(k) \quad (1)$$

where k is an increment of discrete time, z is an integrator state, y is the output, $G_{wi}$ and $G_{wp}$ are integral and proportional gains used to adjust the system response. The controller is augmented here with the ability to resynchronize when commanded to do so by the reorganization switch control block. Resynchronization can include resetting the output and updating the gains.

Velocity feed forward 314 supplies a component of the output based on the nominal dynamics of the motor and would give an output commanded force profile $F^*$ sufficient to make the linear motor match the desired speed profile if there were no disturbances or uncertainties in the motor system. Without loss of generality, a feed forward algorithm such as $$F^* = m\frac{d\omega^*}{dt} + B\omega^* \quad (2)$$

is used here where d/dt is a derivative operator, m is the effective mass of the motor and load, and B is the viscous friction. Position feed forward 316 is actually the integral of the commanded velocity and is in fact a position feed forward term that is consistent with the desired velocity trajectory.

The force command and the measured speed are input to a load estimator 318. Load estimator 318 outputs the equivalent disturbance load on the system. In its simplest form, this block can look for changes in the commanded force for a particular class of launch and use this to indicate that the load has changed. It could also take the form of a load observer where a mathematical model of the mechanical system is used in a closed loop estimator with the measured speed to generate a load force output. In any case, the estimated load can be used to monitor the health of the motor system, be a tool for preventive maintenance, or aid in locating areas along the track that might have degraded.

The force to current conversion 320 takes the desired force as an input and a desired motor flux and generates vector current commands $I_{dq}^*$. The detailed theory behind a standard vector current controller can be found in the literature. The direct axis current $I_d$ can be used to regulate the motor flux while the quadrature axis current $I_q$ can be used to regulate the motor force. These commanded currents are taken as command inputs into the current controller. The type of current controller equations depend upon the application and can involve further direct and quadrature axis decoupling terms. Detailed information can be found in present state of the art. Without loss of generality, the current controller equations used here are a proportional-integral (PI) controller such as $$x_{dq}(k+1) = x_{dq}(k) + \delta(I^*_{dq} - I_{dq})$$

$$y_{dq}(k) = G_i x_{dq}(k) + G_p(I^*_{dq} - I_{dq}) \quad (3)$$

where x are the integrator states, $y_{dq}$ are the outputs, and $G_i$ and $G_p$ are the integral and proportional gain matrices, respectively.

Current feed forward 322 supplies a component of the output based on the nominal dynamics of the motor and would give output commanded voltages profile $V_{dq}^*$ sufficient to make the linear motor match the desired commanded current profiles if there were no disturbances or uncertainties in the motor system. Without loss of generality, a feed forward algorithm such as $$v_{dq}^* = L_{sdq}(1-\gamma)\frac{di_{dq}^*}{dt} + L_{sdq}\left(\frac{1}{\tau_s} + \frac{\gamma}{\tau_r}\right)i_{dq}^* \quad (4)$$

$$\gamma = \frac{M_{dq}^2}{L_{sdq} L_{rdq}}$$

where $L_{sdq}$, $L_{rdq}$, $M_{dq}$ are primary, secondary, and mutual inductances of the motor, and $\tau_r$ and $\tau_s$ are secondary and primary time constants of the linear motor. The feed forward can include additional cross coupling terms if further accuracy is required.

The output of the current controller, $v_{dq}^*$, is passed through two mathematical transformations to give the voltages $v_{abc}$ that are applied to the motor. These transformations can be found in the literature, with the first one being a dq-to-αβ 324 (sometimes referred to as stationary dq frame) translational transformation that uses sine and cosine functions that require shuttle position information. The second one αβ-to-abc 326 being based on mathematical scaling that expresses the equivalent two phase motor as a three phase motor. Note that the number of phases on the motor can be changed without affecting the essence of this control scheme simply by changing the mathematics in this transformation. Depending upon the motor wiring, a zero sequence current component can also be encountered. This, too, is easily handled by using industry standard modifications to these mathematical transformations, and by adding the zero sequence current controller component to the current control equations.

In order for the vector controller to function properly, the sine and cosine generator block 328 needs the electrical position input $X_e$. When a position sensor such as a linear encoder is present, $X_e$ is calculated as the sum of the slip angle $X_{slip}$ and the position sensor output $X_{ps}$. The output of the sine and cosine generator block 328 is fed into the dq-to-αβ transformation 324 to generate the voltage $v_{\alpha\beta}^*$ that is derived from the current controller 325, and the output is fed into the inverse transformation αβ-to-dq 330 that is used to generate the feed back current Idq from Iαβ needed by the current controller 325. When position sensorless control is appropriate, the observer block is used to generate the electrical position information needed by the sine and cosine generator 328 based upon the measure currents and voltages from the motor. If block switch location information is available, a technique has been developed here to use that information to improve the output of the observer. The observer block also incorporates a disturbance estimator 332 that can be used to monitor the health of the linear motor system. Notice that there is a gain block 336 following the slip angle generator 334 that is set to one if the motor is an induction motor or zero if is a synchronous motor.

Reorganizing switch control block 338 along with switches SW1, SW2, SW3, SW4, and SW5 are used to automatically reconfigure the controller. The reorganizing switch controller includes hot spot sensor location inputs (from hot spot sensor locator 340) along with failure detectors for the current sensors and the position sensors. A set of logic conditions are derived that defines the reconfiguration sequence.

Reorganization switch control 338 detects hot spot sensors, encoder failures, and current sensor failures and determines the required controller reconfiguration. Reorganization switch control 338 achieves reconfiguration via proper positioning of the switch controls. Reorganization switch control 338 also notifies controller subsystems that resynchronization might be required in order to transition to a new control scheme without causing unnecessary transients in the system. This "bumpless" transition is achieved during nominal hot spot sensing control and is minimized when transitioning to compensate for a position or current sensor fault.

There are many possibilities for the transition decisions depending upon the sensors being detected, faults being detected, or even desired operating conditions. Table I shows an implementation suitable for the launch control system. Additional sets of conditions can be included by enlarging the decision matrix without changing the basic structure of the controller. It may also be desirable to reduce the number of different reconfiguration conditions. This too, does not change the basic structure of the controller. For example, if feed forward control was undesirable, then only configurations 1, 2, and 3 would be used. Errors that would have forced the system into the other configurations might then result in a system shutdown.

The first column in Table I is the configuration number. The next three columns show the controller configuration. The velocity controller and current controller are both active when the table entry is ON. In this condition, both the feedforward and feedback components of the respective controller are engaged. A table entry of feedforward means that only the feedforward block is active and the feedback portion of the controller is off. The Position column indicates how the position information is being fed into the controller. Note that a hot spot sensor is an encoder position strip with known location and length along the track. When the encoder with hot spot sensing is being used, the slip angle generator plus encoder output information are being used, along with apriori knowledge of the location and length of the hot spot senor encoder strip. The apriori knowledge is in the database and is used so that the controller can anticipate when the reconfiguration and resynchronization will be activated thereby avoiding generating a force transient resulting from the detector lag that would accompany the detection of a suddenly missing position sensor. If the Position column has only an encoder entry, it means that a position sensor was detected that was not included in the apriori hot spot sensor database. If the position sensorless observer is used, this means that a mathematical observer is used to generate the necessary position and velocity information for the controller that does not use the position encoder sensor. There are many types of observers found in the literature that can be used including flux based observers that use voltage and current measurements and mechanical observers that use models of the mechanical system. The next three columns indicate which sensors are working and have been detected, including the current sensors, the position sensor, and a hot spot sensor. The last five columns indicate the switch states in FIG. 3 that correspond to the controller configuration. An entry of X means that the state is "don't care".

The Good Position Sensor detector is active even when a hot spot sensor encountered. If the hot spot sensor encoder was to fail, note that the system would reorganize to configuration two and continue to run. There will be a transient due to a sudden failure due to detector lag and it is likely that there will be some performance degradation but the system will attempt to make a successful launch. Similarly, if a current sensor failure is detected the system reorganizes into configuration four, five, or six as appropriate but still attempts to make a successful launch. Thus, the Hot Spot Sensing Controller is inherently fault tolerant. It should also be noted that the recovery of a failed sensor can also cause the controller to reorganize so as to give optimal performance, if recovery is beneficial in the application.

figuration one would likely be used. During a slow retract operation, many sensorless controllers are ineffective and there is no need for high speed or high performance. As the shuttle approaches its home position, it will encounter the hot spot sensor one again, allowing it to reorganize to configuration one and to home in precisely using the high accuracy encoder feedback to measure position.

Sensor detection is performed in the Reorganization Switch Control subsystem. As in Table I, the sensors information being detected is presence of a hot spot sensor, presence of a good position sensor, and presence of good current sensors. If other types of sensors or conditions were of interest, then the detection and decision matrix would be extended. For this application, these three are of interest.

Figure 5:
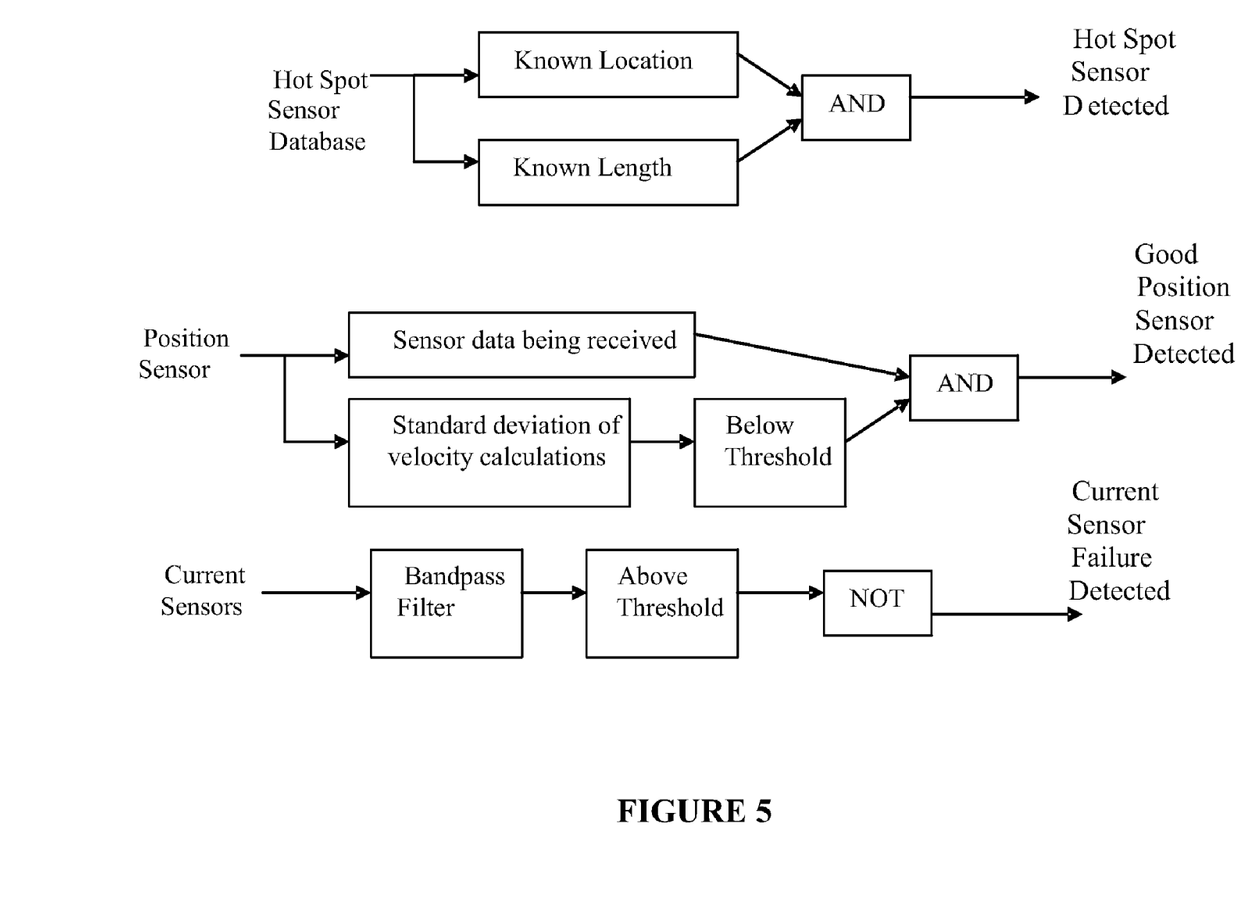
FIG. 5 illustrates the present invention's sensor detection architecture.
Figure 6:
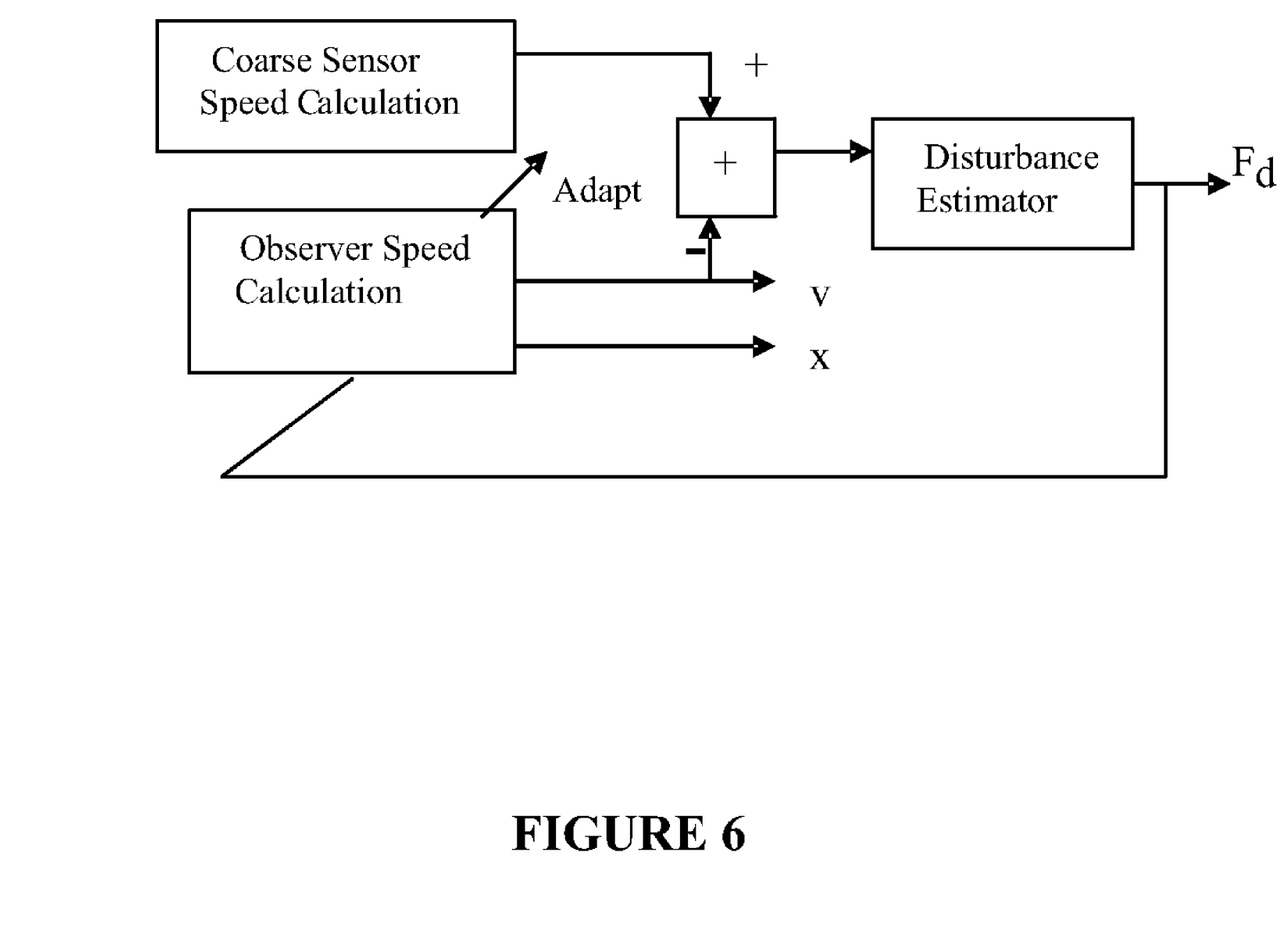
FIG. 6 illustrates an adaptive observer with coarse sensor corrections block diagram.

The detection architecture is shown in FIG. 5. The inputs to these detectors can also be seen in FIG. 3. The outputs from these detectors are directed to the controller reorganization conditions in Table I. Because the hot spot sensors are encoder segments that are placed on the track ahead of time, their location and lengths are known. Under normal operating conditions, this information, when matched with the fact that a good position sensor has been detected, indicates that a hot spot sensor has been encountered. Because one hot spot sen-

TABLE I

Controller Reorganization Conditions

| | Controller Configuration | | | Current Sensor Failure | Good Position Sensor | Hot Spot Sensor | Switch States SWx | | | | |
|---|---|---|---|---|---|---|---|---|---|---|---|
| Config. | Velocity | Current | Position | | | | 1 | 2 | 3 | 4 | 5 |
| 1 | ON | ON | Encoder w/ Hot Spot Sensing Data | 0 | 1 | 1 | 1 | 1 | 2 | 2 | 1 |
| 2 | ON | ON | Position Sensorless Observer | 0 | 0 | X | 1 | 1 | 1 | 1 | 1 |
| 3 | ON | ON | Encoder | 0 | 1 | 0 | 1 | 1 | 2 | 2 | 1 |
| 4 | Feedforward | Feedforward | Not Used | 1 | 0 | X | 0 | 0 | 2 | X | 2 |
| 5 | ON | Feedforward | Encoder w/ Hot Spot Sensing Data | 1 | 1 | 1 | 1 | 0 | 2 | 2 | 1 |
| 6 | ON | Feedforward | Encoder | 1 | 1 | 0 | 1 | 0 | 2 | 2 | 1 |

Figure 4:
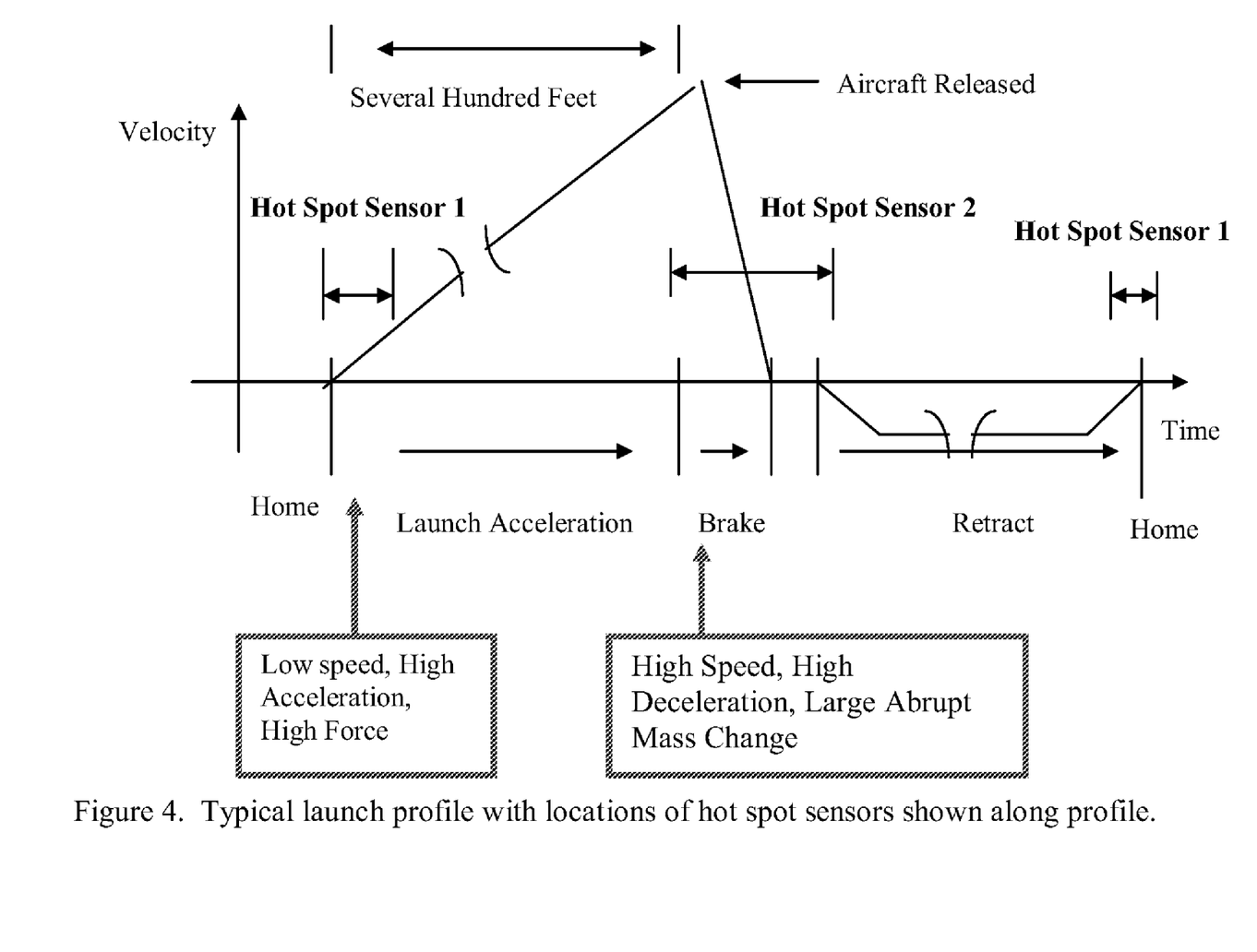
FIG. 4 illustrates a typical launch profile with locations of hot spot sensors along profile.

FIG. 4 shows the typical launch profile and when the hot spot sensors would be encountered. Note that negative speed indicates that the shuttle is moving in reverse. During retract, the shuttle moves in reverse back to the home position. Under nominal operation of the Hot Spot Sensing Controller, the launch system will start from rest encountering hot spot sensor one, thereby beginning in configuration one. As the shuttle moves along the track, the system will reconfigure to configuration two without generating any transients. It will move for most of the track in configuration two so that there is no position sensor needed for most of the run. This allows for position sensor minimized control. As the shuttle approaches the aircraft launch point and shuttle brake region, a second hot spot sensor would be encountered and the system would reorganize back to configuration one. The encoder would be used in this region due to the large mass change in the system as the aircraft is released from the motor and the very sudden braking demand to stop the shuttle. After the shuttle has come to rest, the system would slowly retract to starting position. During retract, a combination of configuration four and consor is placed at the beginning of the track, it should be encountered right at the launch is started. The other will be encountered in region that the plane is launched. Since the nominal launch profile is known, both the nominal location and the nominal time during the launch when these should be detected is known.

The detection of a good position sensor is based upon two pieces of information. The first is that there is position data being received at all. In the case of an equivalent encoder, this means that position pulses are being detected. Failure of this condition means that no encoder senor is on the track at all or, if there is one, there is a broken line or other catastrophic failure. The second piece of information is the standard deviation of velocity calculation followed by a below threshold detect. This is designed to detect a degraded position sensor where the normal pulse train becomes irregular. This part of the calculation has been used effectively to detect rotary encoder failures and has been found here to also be effective for the linear encoder. Mathematically, a 20 point moving window is advanced along the velocity data and the average standard deviation is calculated as $$\bar{\sigma}_\omega = \frac{\sum_{i=1}^{20} \sqrt{(\omega_i - \bar{\omega}_i)^2}}{20} \tag{5}$$

where the bar indicates average, ω is the velocity, and σ is the standard deviation. The calculation of velocity is derived from a mechanical observer or band limited differentiation of the position data from the sensor. The number of points in the moving window is application dependent and can be changed without loss of generality.

The detection of a current sensor failure is based on the fact that the currents are fundamentally sinusoidal with a known frequency profile during the launch. The band pass filter followed by the threshold detector becomes active whenever the current is sinusoidal and in the expected frequency band. The NOT block is used so that the lack of output from the above threshold detector activates the current sensor failure signal.

Note that in each of these cases, other types of sensor detectors and other methods to determine encoder failure can be utilized without changing the fundamental behavior of the Hot Spot Sensoring Controller.

The observer used in the Hot Spot Sensoring Controller is a position sensorless observer. There are many types of observers found in the literature that can be used including flux based observers and adaptive observers that use voltage and current measurements. The effectiveness of observers based upon measurement of the electrical waveforms of the motor is greatly dependent upon the motor geometry. A sensitivity factor has also been developed in this work to aid in predicting the performance of electrical measurement based observers and will be discussed in a later section. Assuming that the geometry lends itself to this type of observer, a typical one can be based on a simple αβ-frame flux observer from measured αβ-frame currents and voltage information such as $$\lambda_{\alpha 1} = \int (V_{\alpha 1} - R_1 i_{\alpha 1}) dt \tag{6}$$

$$\lambda_{\beta 1} = \int (V_{\beta 1} - R_1 i_{\beta 1}) dt \tag{7}$$

where the subscript 1 indicates the flux in the primary of the linear motor. The flux in the secondary can be calculated from the flux in the primary and the parameters of the motor, and finally the position information can be derived.

A more sophisticated adaptive electrically based observer can be used such as $$\frac{d}{dt}\begin{bmatrix} \hat{i}_{\alpha\beta} \\ \hat{\lambda}_{\alpha\beta} \end{bmatrix} = \begin{bmatrix} \hat{F}_{11} & \hat{F}_{12} \\ \hat{F}_{21} & \hat{F}_{22} \end{bmatrix}\begin{bmatrix} \hat{i}_{\alpha\beta} \\ \hat{\lambda}_{\alpha\beta} \end{bmatrix} + \begin{bmatrix} G_1 \\ 0 \end{bmatrix} v_{\alpha\beta} + K(\hat{i}_{\alpha\beta} - i_{\alpha\beta}) \tag{8}$$

where the currents $\hat{i}_{\alpha\beta}$ and fluxes $\hat{\lambda}_{\alpha\beta}$ are state variables, the voltage $v_{\alpha\beta}$ and current $i_{\alpha\beta}$ are inputs, $F_{11}$, $F_{12}$, $F_{21}$, $F_{22}$, $G_1$ are functions of the motor parameters, and K is an adaptive gain matrix. The flux in the secondary can be calculated from the flux in the primary and the parameters of the motor, and finally the position information can be derived.

In some applications, there may be feedback available from the block switch sensors. This is indicated by the dotted line from the linear motor in FIG. 3. Typically, this is simply a pulse that indicates the moving shuttle is over that sensor. Since the nominal locations of these sensors are known, some knowledge of shuttle position is available. Because the block switch sensors are usually spaced far apart, this position information cannot be used directly to regulate a launch. However, an adaptive observer based on the mechanical equations of motion that utilizes block switch sensor correction has been developed here and can be used for launch operations. Note that the block switch sensors are essentially a very coarse position sensor. Hence, the method below is applicable to a system with block sensors or any other type of coarse position sensors. The system is therefore capable of adapting itself between a higher resolution position sensor and an effective position sensor of different pulse density.

The coarse sensors are utilized to estimate the speed when a coarse sensor is encountered. For the observer, no encoder segment is used. In between the coarse sensors, the mechanical equations of motion are used to estimate the speed based on the last speed obtained from the coarse sensor and the estimated force the motor generates. The position is calculated based on the estimated speed.

This system's mechanical equation is given as $$F_e = M\frac{dv}{dt} + Bv + C + F_d \tag{9}$$

where
$F_e$: Generated electromagnetic force by the motor in Newton (N)
$F_d$: Disturbance force applied in Newton (N)
M: Mass of the motor in kilograms (kg)
v: Speed of the motor in meter per second (m/sec)
B: Viscous friction between the motor and the rail in Newton-second per meter (N-sec/m)
C: Coulomb friction between the motor and the rail in Newton (N)

The solution of (9) in the discrete time domain can be written as $$v_{n+1} = \left(\frac{F_e \pm C \pm F_d}{B}\right)\left(1 - e^{-\frac{B}{M}T_s}\right) + v_n e^{-\frac{B}{M}T_s} \tag{10}$$

where,
$T_s$: Sample time.
$v_n$: Calculated speed from the previous cycle.
$v_{n+1}$: Calculated speed in the current cycle.

The ± sign in front of the C is determined by the speed and the direction of the total applied force to the mechanical system. The position can be estimated from the trapezoidal integration method as $$x_{n+1} = (v_{n+1} + v_n)\frac{T_s}{2} + x_n \tag{11}$$

Or, if $v_{n+1}$ is placed in (11), it can also be expressed as $$x_{n+1} = \left(\frac{F_e \pm C - F_d}{B}\right)\frac{T_s}{2}\left(1 - e^{-\frac{B}{M}T_s}\right) + v_n\frac{T_s}{2}\left(1 + e^{-\frac{B}{M}T_s}\right) + x_n \tag{12}$$

The mechanical observer is developed by using (10) and (12).

The correction to the observer can be based on the coarse sensors. The following equality based on the trapezoidal distance calculation can be written for the coarse sensors.

$$\Delta x = (v_{k+1} + v_k)\frac{\Delta t}{2} \tag{13}$$

where, $\Delta x$: Distance in between coarse sensors, which is constant.
$\Delta t$: Amount of time takes to get from one coarse sensor to the other, which is not constant.
$v_{k+1}$: Current speed calculation from the coarse sensor.
$v_k$: Previous speed calculation from the previous coarse sensor.

The coarse sensor speed calculation from (13) is $$v_{k+1} = \frac{2\Delta x}{\Delta t} - v_k \tag{14}$$

Equation (14) provides very good speed estimation from the coarse sensor if the actual speed is a ramp in time, as is the case in the aircraft launch system. For systems with constant speeds over the control period, $$v_{k+1} = \frac{\Delta x}{\Delta t} \tag{15}$$

can provide a good speed estimate. In some applications, a combination of these two algorithms, or equivalent, may be appropriate. When a coarse sensor is encountered, the velocity estimate from the observer is updated and resynchronized, and the velocity controller is resynchronized.

Next, the velocity as calculated from the coarse sensors is used with the velocity as calculated from the mechanical observer to generate an estimate of any disturbance force. The velocity calculated from the mechanical observer (10) is subtracted from the velocity calculated from the coarse sensor (14) to form an error signal. The error signal is used to generate an estimate of the disturbance force in the system and to adapt the mechanical observer to account for the disturbance. The speed error is integrated with the trapezoidal integration method during the launch profile. The result is multiplied by a gain. The end result constitutes the disturbance force. The algorithm can be formulated as in the following.

$$F_d(k+1) = G\frac{T_s}{2}[e(k+1) + e(k)] + F_d(k) \tag{16}$$

where, $F_d$: Estimated disturbance force in Newtons.
e: Speed error.
G: Gain.

The disturbance force $F_d$ is inserted into (10) and (12) so that the mechanical observer adapts to the disturbances. Note that the disturbance estimator can be used in conjunction with any of the observer types by using the estimated speed from that observer in the calculation of the error signal in (9).

The disturbance force is also monitored as in indicator of the mechanical health of the system. Wear in the system or other degradation will result in a change in the disturbance force. This signal can be used to give early warning of mechanical wear, preventive maintenance, or help to pinpoint areas that may need to be serviced.

Figure 7:
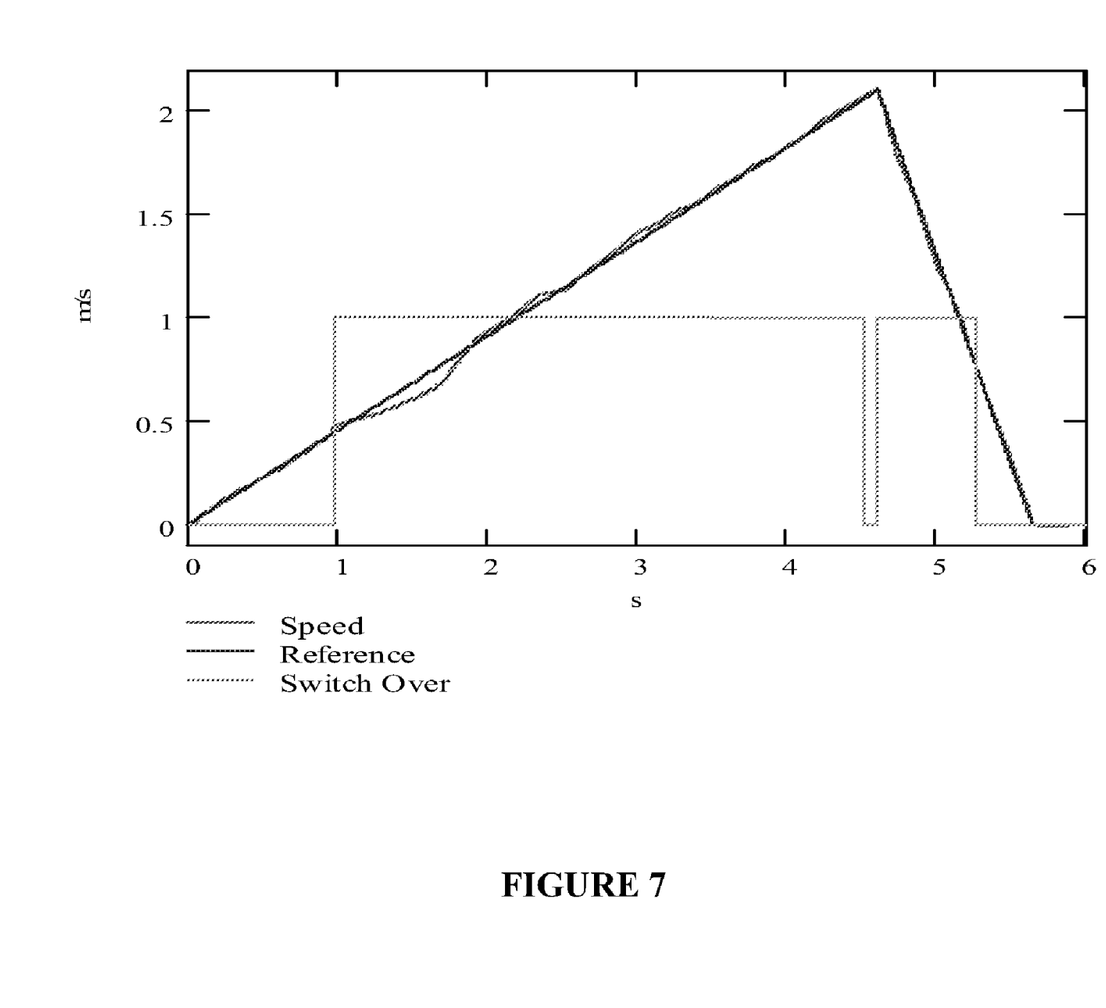
FIG. 7 illustrates a hot spot sensor controller operating with disturbances along a launch profile.

Operation of the Hot Spot Sensoring Controller with a linear induction motor over an aircraft launch profile is shown in FIG. 7. Two hot spot sensors are used. One short encoder strip at the beginning of the launch and the other at the aircraft release point. In this example coarse block switch sensors are available. The observer being used is the adaptive observer based on the mechanical equations with coarse sensor adaptation and disturbance estimator. Overlayed in FIG. 7 are the reference speed, the actual Speed, and the switchover logic signal. When the switchover signal is zero, the Hot Spot Sensor has been detected and is being used. When it is one, the adaptive observer with no encoder is being used.

Figure 8:
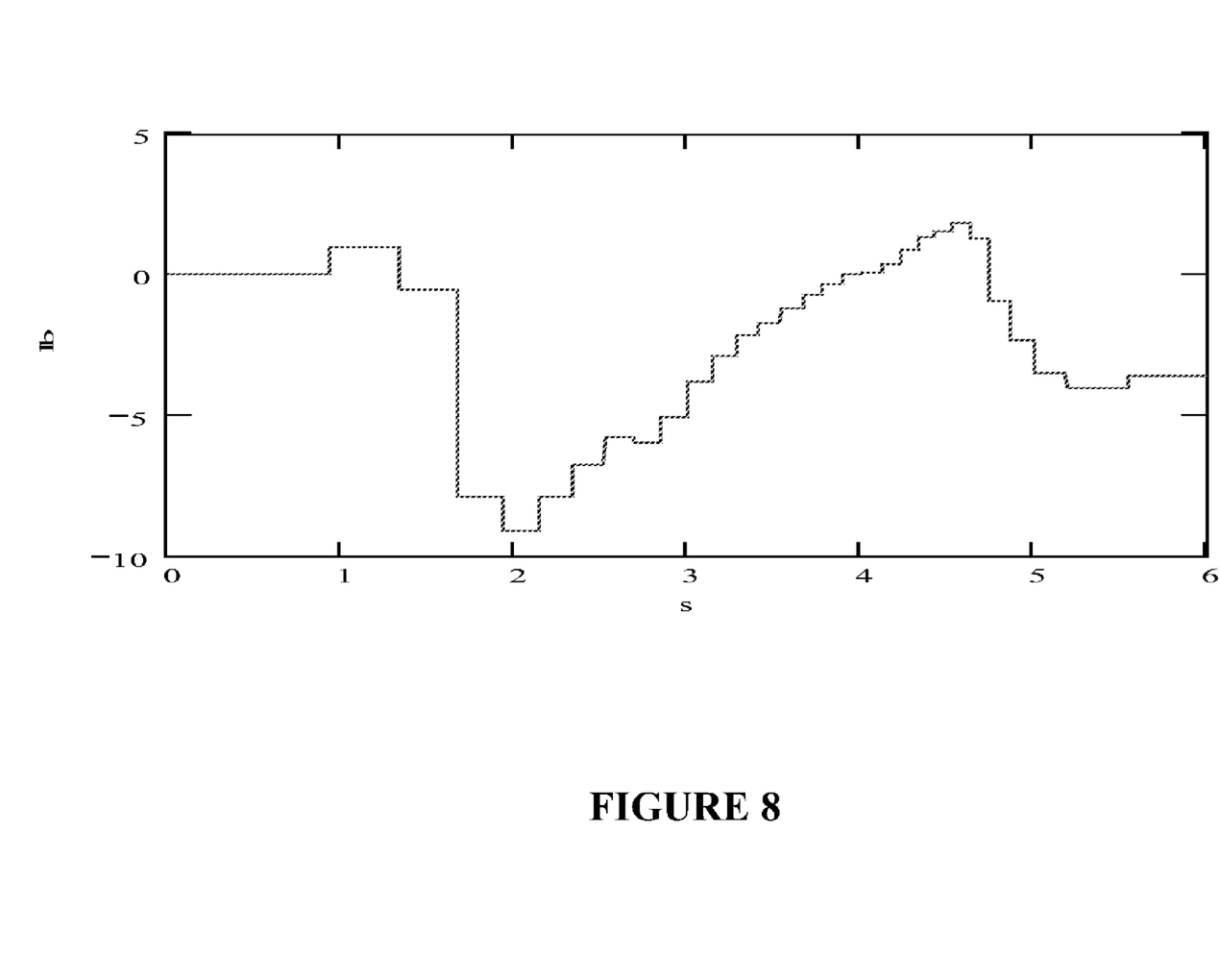
FIG. 8 illustrates an output of the disturbance estimator as it operates as part of the Hot Spot Sensing Controller.

FIG. 8 shows the output of the disturbance estimator as it operates as part of the Hot Spot Sensoring Controller.

FIG. 8. Disturbance force estimator.

For sensorless operation using electrical observers such as (6)-(7) or (8), there is no position transducer to reflect the variations of motor speed. Any external force should be observed through sensing the phase current variations. The amplitude of the phase current variations is in fact dependent on the electromagnetic behavior of the motor, which is inherent in the motor design. In other words, the phase current variation due to speed change at a constant excitation voltage and frequency is not the same for different induction motors. Even for a specific motor, it is not expected that the variation of phase current due to speed changes will be the same at different operating speeds and various excitation voltages and frequencies.

If a change in motor speed results in a measurable phase current variation, the observer is able to easily identify the actual speed change and modify the estimated speed. However, if the motor's phase current variation is not sensitive enough to actual speed variation, the actual speed change may not be detectable by the observer.

Based on the above discussion, in order to analyze the performance of the observer based induction motor drives, we have introduced a novel concept, which is the sensitivity of phase current to speed variation. In mathematical form, it is defined as following:

$$CS = \frac{\partial I_s}{\partial \omega_r}\bigg|_{\substack{v_s=const.\\\omega_s=const.}} \tag{17}$$

in which $I_s$, $\omega_r$, $\omega_s$, and $V_s$ stand for phase current, motor speed, synchronous speed and phase voltage. Furthermore, the percentage of current sensitivity to speed variation is defined as following:

$$CS(\%) = 100 * \frac{(\partial I_s/I_s)}{\partial \omega_r}\bigg|_{\substack{v_s=const.\\\omega_s=const.}} \tag{18}$$

Based on the sensitivity analysis, the variation of phase current due to motor speed change should be as large as possible. That is, the motor should be designed such that (17) and (18) are large to improve sensorless control performance. The sensitivity definitions (17) and (18) apply to all motor types. They also apply to rotary and linear motors.

In the case of linear and rotary induction motors, further simplifications based on the standard equivalent "T" circuit model can be made. In order to maximize the sensitivity factors (17) and (18), the linear induction motor should be designed such that $$\frac{X_m}{R_2} \gg 1 \quad (19)$$

$$\frac{X_m}{X_1} \gg 1 \quad (20)$$

where $X_m$ is the magnetizing reactance, $R_2$ is the secondary resistance (rotor resistance in the case of a rotary motor), and $X_1$ is the primary leakage reactance (stator leakage reactance in the case of a rotary motor).

As an example of the use of (19), if it is assumed that the primary frequency is 60 Hz, and that a secondary is used that consists of a layer of aluminum and a layer of steel backing, then (19) can be expressed as $$\frac{X_m}{R_2} = 1200\tau^2 \frac{d}{d+g} \quad (21)$$

where d is the thickness of the aluminum plate, g is the width of the airgap, and $\tau$ is the pole pitch. To maximize (21), the motor should be designed so that the airgap is as small as possible and the pole pitch is as large as possible.

Figure 9:
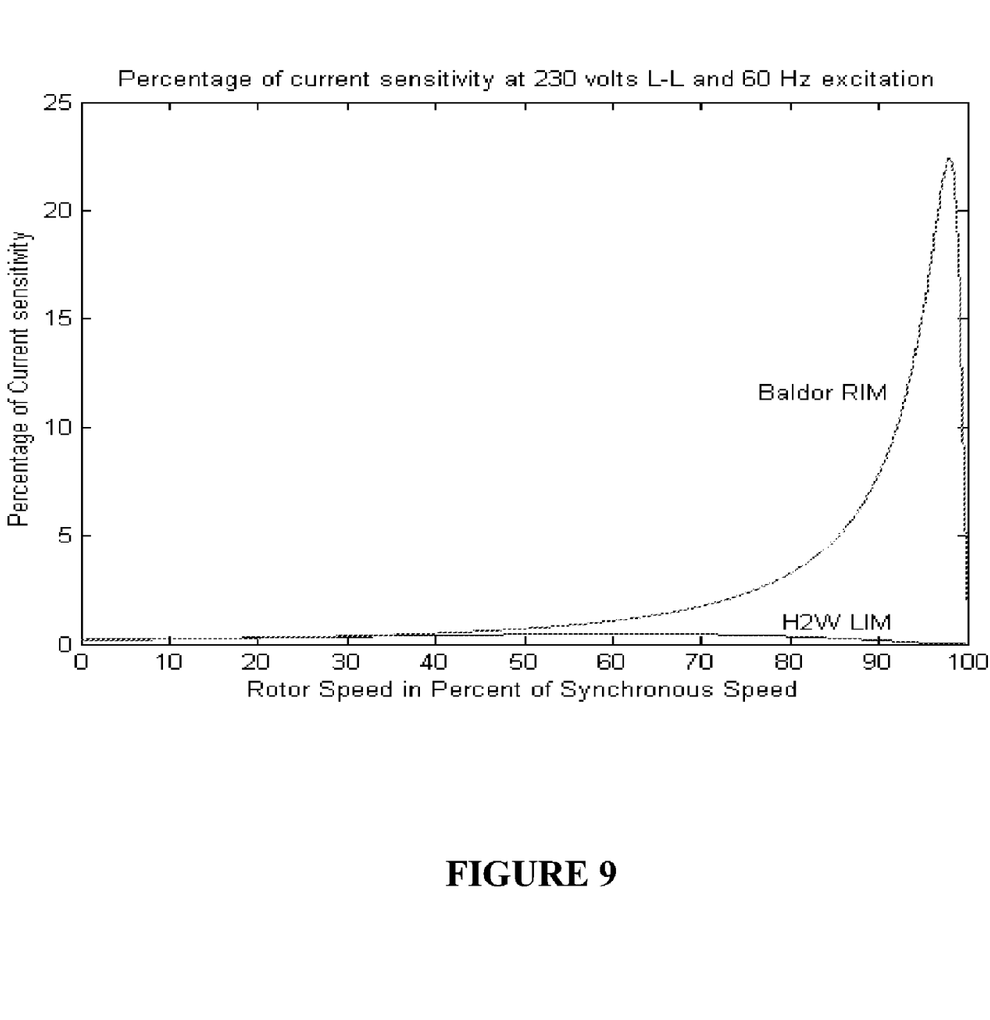
FIG. 9 illustrates the percent sensitivity plots for linear induction motor and rotary induction motor.

FIG. 9 plots the percent sensitivity factor for an off the shelf rotary motor and a linear motor comprised of off the shelf components. At each motor's operating point, the linear motor sensitivity is less than 1% while the rotary motor's sensitivity is greater than 6%. Notice, too, that as the load is increased on the rotary motor, the percent of synchronous speed drops and the sensitivity approaches 22%. For these motors, observer based sensorless control utilizing measurement of currents and/or voltages would be most effective on the rotary motor.

CONCLUSION

A system and method has been shown in the above embodiments for the effective implementation of a hot spot sensing control of linear motors. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by type of linear motor.

The invention claimed is:

1. A method implemented in a controller for a linear motor comprising:
   detecting position sensors distributed along stroke; and
   when properly functioning, reorganizing controller employing said detected position sensors and using them for control, and when said position sensors are not present, or when said position sensors are present but malfunction, or when said position sensors are present but of limited length, reorganizing said controller to operate without them, and in the event of failed sensor recovery, to operate with them again.

2. The method of claim 1, wherein said reorganization is done via configuring a plurality of switches.

3. The method of claim 2, wherein said configuring of said plurality of switches is done using a decision matrix storing controller reorganization conditions; and upon detecting available sensors, encoder failures, and current sensor failures, said reorganization configuring at least one switch in said plurality of switches based on information in said decision matrix to use available sensors.

4. The method of claim 2, wherein said operating without said sensors include any of the following: observers based on electrical measurements, adaptive or self correcting observers based on mathematical models with a correction from any operating sensors, and feedforward profiles.

5. The method of claim 4, wherein said observers estimate the position of a secondary for position sensor minimized control operation.

6. The method of claim 5, wherein said observers are based on any of the following: signal measurements such as voltages/currents, mathematical models of mechanical/electrical dynamics of a system associated with said controller of said linear motor.

7. The method of claim 6, wherein said mathematical model of said mechanical dynamics further comprises a correction mechanism based on feedback from at least one coarse position sensor such as block switch sensors.

8. The method of claim 7, wherein said observer utilizes said feedback information to update and resynchronize its outputs and states.

9. The method of claim 6, wherein a disturbance force estimator for linear motors uses a difference between outputs of said mathematical model of the system dynamics with a measurement of motor position or speed.

10. The method of claim 9, wherein said measurements are derived from at least one coarse sensor such as block sensors or a position encoder.

11. The method of claim 9, wherein said disturbance force estimator records, maps, or monitors disturbances for any of the following: early warning of failures, mechanical wear, preventive maintenance, and fault diagnostics and servicing.

12. The method of claim 6, wherein said observer based on mathematical model of the mechanical/electrical dynamics includes a correction mechanism based on feedback from coarse position sensors such as block switch sensors and adapts itself to include a correction based on an estimate of any load or force disturbances, either in real-time or from apriori knowledge.

13. The method of claim 1, wherein said position sensors are encoders distributed along said stroke.

14. The method of claim 1, wherein said controller is used in an electromagnetic aircraft launch system.

15. The method of claim 14, wherein a short strip of position encoder is placed in critical locations such as start of launch and in the aircraft release and braking regions.

16. The method of claim 1, wherein said controller is used in a maglev system.

17. The method of claim 1, wherein said controller is used in a material handling application.

18. The method of claim 1, wherein a sensitivity factor is used to determine whether position sensorless control based on measurement of motor currents performs effectively, said sensitivity factor given by $$CS = \frac{\partial I_s}{\partial \omega_r}\bigg|_{\substack{v_s=const.\\\omega_s=const.}}$$

in which $I_s$, $\omega_r$, $\omega_s$, and $V_s$ stand for phase current, motor speed, synchronous speed and phase voltage.

19. The method of claim 18, wherein a percentage of current sensitivity to speed variation is calculated as following:

$$CS(\%) = 100 * \frac{(\partial I_s/I_s)}{\partial \omega_r}\bigg|_{\substack{v_s=const.\\\omega_s=const.}},$$

said percentage of current sensitivity to speed variation is used to determine whether position sensorless control based on measurement of motor currents performs effectively.

20. The method of claim 1, wherein a sensitivity factor is used to determine whether position sensorless control based on measurement of motor currents performs effectively, said sensitivity factor expressed in terms of equivalent circuit parameters $$\frac{X_m}{R_2} \gg 1 \text{ and } \frac{X_m}{X_1} \gg 1$$

where $X_m$ is the magnetizing reactance, $R_2$ is a secondary resistance or rotor resistance in case of a rotary motor, and $X_1$ is a primary leakage reactance or stator leakage reactance in the case of a rotary motor.

21. The method of claim 1, wherein said linear motor's geometry and materials are picked based on a sensitivity factor such that a given motor will be effective with measurement based sensorless control methods, said sensitivity factor given by $$CS = \frac{\partial I_s}{\partial \omega_r}\bigg|_{\substack{v_s=const.\\\omega_s=const.}}$$

in which $I_s$, $\omega_r$, $\omega_s$, and $V_s$ stand for phase current, motor speed, synchronous speed and phase voltage.

22. The method of claim 21, wherein said linear motor's geometry and materials are picked based on a percentage of current sensitivity to speed variation, said percentage of current sensitivity to speed variation is calculated as the following:

$$CS(\%) = 100 * \frac{(\partial I_s/I_s)}{\partial \omega_r}\bigg|_{\substack{v_s=const.\\\omega_s=const.}}.$$

23. The method of claim 1, wherein said linear motor's geometry and materials are picked based on a sensitivity factor such that a given motor will be effective with measurement based sensorless control methods, said sensitivity factor expressed in terms of equivalent circuit parameters $$\frac{X_m}{R_2} \gg 1 \text{ and } \frac{X_m}{X_1} \gg 1$$

where $X_m$ is the magnetizing reactance, $R_2$ is a secondary resistance or rotor resistance in case of a rotary motor, and $X_1$ is a primary leakage reactance or stator leakage reactance in the case of a rotary motor.

24. A system implementing a controller for linear motors comprising:
  a plurality of switches;
  a reorganization switch control detecting available hot spot sensors, encoder failures and/or recovery, and current sensor failures and/or recovery;
  a storage storing a decision matrix having controller reorganization conditions; and
  upon detecting available hot spot sensors, encoder failures and/or recovery, and current sensor failures and/or recovery, said reorganization switch control reorganizing itself via configuring at least one switch in said plurality of switches based on information in said decision matrix to operate without available sensors and using available sensors.

25. The system of claim 24, wherein said operating without available sensors includes any of the following: observers based on electrical measurements, adaptive or self correcting observers based on mathematical models with a correction from any operating sensors, and feedforward profiles.

26. The system of claim 25, wherein said observers estimate the position of a secondary for position minimized control operation.

27. The system of claim 25, wherein said observers are based on any of the following: signal measurements such as voltages/currents, mathematical models of mechanical/electrical dynamics of a system associated with said controller of said linear motor.

28. The system of claim 27, wherein said mathematical model of said mechanical dynamics further comprises a correction mechanism based on feedback from at least one coarse position sensor such as block switch sensors.

29. The system of claim 28, wherein said observer utilizes said feedback information to update and resynchronize its outputs and states.

30. The system of claim 28, wherein said observer based on mathematical model of the mechanical/electrical dynamics includes a correction mechanism based on feedback from coarse position sensors such as block switch sensors and adapts itself to include a correction based on an estimate of any load or force disturbances, either in real-time or from apriori knowledge.

31. The system of claim 27, wherein said system further comprises a disturbance force estimator for linear motors uses a difference between outputs of said mathematical model of the system dynamics with a measurement of motor position or speed.

32. The system of claim 31, wherein said measurements are derived from at least one coarse sensor such as block sensors or a position encoder.

33. The system of claim 31, wherein said disturbance force estimator records, maps, or monitors disturbances for any of the following: early warning of failures, mechanical wear, preventive maintenance, and fault diagnostics and servicing.

34. The system of claim 24, wherein said position sensors are encoders distributed along said stroke.

35. The system of claim 24, wherein said system is an electromagnetic aircraft launch system.

36. The system of claim 35, wherein a short strip of position encoder is placed in critical locations such as start of launch and in the aircraft release and braking regions.

37. The system of claim 24, wherein said controller is used in a maglev system.

38. The system of claim 24, wherein said controller is used in a material handling application.

39. The system of claim 24, wherein a sensitivity factor is used to determine whether position sensorless control based on measurement of motor currents performs effectively, said sensitivity factor given by $$CS = \frac{\partial I_s}{\partial \omega_r}\bigg|_{\substack{v_s=const.\\ \omega_s=const.}}$$

in which $I_s$, $\omega_r$, $\omega_s$, and $V_s$ stand for phase current, motor speed, synchronous speed and phase voltage.

40. The system of claim 39, wherein a percentage of current sensitivity to speed variation is calculated as following:

$$CS(\%) = 100 * \frac{(\partial I_s/I_s)}{\partial \omega_r}\bigg|_{\substack{v_s=const.\\ \omega_s=const.}},$$

said percentage of current sensitivity to speed variation is used to determine whether position sensorless control based on measurement of motor currents performs effectively.

41. The system of claim 24, wherein a sensitivity factor is used to determine whether position sensorless control based on measurement of motor currents performs effectively, said sensitivity factor expressed in terms of equivalent circuit parameters $$\frac{X_m}{R_2} \gg 1 \text{ and } \frac{X_m}{X_1} \gg 1$$

where $X_m$ is the magnetizing reactance, $R_2$ is a secondary resistance or rotor resistance in case of a rotary motor, and $X_1$ is a primary leakage reactance or stator leakage reactance in the case of a rotary motor.

42. The system of claim 24, wherein said linear motor's geometry and materials are picked based on a sensitivity factor such that a given motor will be effective with measurement based sensorless control methods, said sensitivity factor given by $$CS = \frac{\partial I_s}{\partial \omega_r}\bigg|_{\substack{v_s=const.\\ \omega_s=const.}}$$

in which $I_s$, $\omega_r$, $\omega_s$, and $V_s$ stand for phase current, motor speed, synchronous speed and phase voltage.

43. The system of claim 42, wherein a percentage of current sensitivity to speed variation is calculated as following:

$$CS(\%) = 100 * \frac{(\partial I_s/I_s)}{\partial \omega_r}\bigg|_{\substack{v_s=const.\\ \omega_s=const.}},$$

said percentage of current sensitivity to speed variation is used to determine whether position sensorless control based on measurement of motor currents performs effectively and/or to pick said liner motor's geometry and materials.

44. The system of claim 24, wherein said linear motor's geometry and materials are picked based on a sensitivity factor such that a given motor will be effective with measurement based sensorless control methods, said sensitivity factor expressed in terms of equivalent circuit parameters $$\frac{X_m}{R_2} \gg 1 \text{ and } \frac{X_m}{X_1} \gg 1$$

where $X_m$ is the magnetizing reactance, $R_2$ is a secondary resistance or rotor resistance in case of a rotary motor, and $X_1$ is a primary leakage reactance or stator leakage reactance in the case of a rotary motor.

45. A controller for linear motors comprising:
 a plurality of switches;
 a reorganization switch control detecting available hot spot sensors, encoder failures, and current sensor failures;
 a decision matrix mechanism having controller reorganization conditions, said decision matrix mechanism receiving sensor inputs and detecting presence and operational status of said received sensor inputs, said decision matrix mechanism inputs motor operating conditions and generates virtual switching signals to reconfigure a motor controller to eliminate or recover use of one or more sensors or operating modes.

* * * * *